(12) United States Patent
Hosur et al.

(10) Patent No.: US 7,050,768 B2
(45) Date of Patent: May 23, 2006

(54) SIGNAL FIELD CONTROLLER, METHOD OF CONTROLLING AND MIMO TRANSMITTER EMPLOYING THE SAME

(75) Inventors: Srinath Hosur, Plano, TX (US);
Srikanth Gummadi, Rohnert Park, CA (US); Michael O. Polley, Garland, TX (US); Manish Goel, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 225 days.

(21) Appl. No.: 10/744,310

(22) Filed: Dec. 22, 2003

(65) Prior Publication Data

US 2005/0136935 A1 Jun. 23, 2005

(51) Int. Cl.
*H04B 1/02* (2006.01)

(52) U.S. Cl. .................. 455/103; 455/101; 455/452.1; 455/515; 370/208; 370/334; 375/267; 375/299; 375/347

(58) Field of Classification Search .................. 455/25, 455/63.4, 101, 103, 230, 434, 515, 452.1; 370/204, 208, 334, 343, 349, 392, 471, 476, 370/474, 480, 522; 375/130, 135, 148, 267, 375/295, 347, 299
See application file for complete search history.

(56) References Cited

U.S. PATENT DOCUMENTS

| | | | | |
|---|---|---|---|---|
| 5,809,012 | A * | 9/1998 | Takase et al. | 370/229 |
| 6,076,094 | A * | 6/2000 | Cohen et al. | 707/104.1 |
| 6,198,775 | B1 * | 3/2001 | Khayrallah et al. | 375/265 |
| 2002/0181546 | A1 * | 12/2002 | Odenwalder et al. | 375/130 |
| 2003/0185241 | A1 * | 10/2003 | Lu et al. | 370/476 |
| 2004/0023621 | A1 * | 2/2004 | Sugar et al. | 455/103 |
| 2005/0088998 | A1 * | 4/2005 | Douglas et al. | 370/338 |

* cited by examiner

*Primary Examiner*—William Trost
*Assistant Examiner*—James D Ewart
(74) *Attorney, Agent, or Firm*—Abdul Zindani; W. James Brady, III; Frederick J. Telecky, Jr.

(57) ABSTRACT

For use with a multiple-input, multiple-output (MIMO) transmitter, a signal field controller, a method of controlling signal fields and a MIMO transmitter incorporating the controller or the method. In one embodiment, the controller includes: (1) a primary signal field mode indicator configured to cause a primary signal field to indicate a presence of a supplemental signal field and provide the primary signal field to the MIMO transmitter for transmission thereby and (2) a supplemental signal field generator coupled to the primary signal field mode indicator and configured to provide a supplemental signal field to the MIMO transmitter for further transmission thereby only when the primary signal field indicates the presence.

19 Claims, 3 Drawing Sheets

SIGNAL FIELD CONTROLLER, METHOD OF CONTROLLING AND MIMO TRANSMITTER EMPLOYING THE SAME

TECHNICAL FIELD OF THE INVENTION

The present invention is directed, in general, to a communication system and, more specifically, to a signal field controller, a method of controlling signal fields and a multiple-input, multiple-output (MIMO) transmitter employing the controller or method.

BACKGROUND OF THE INVENTION

Expansion of the wireless communication arena is being driven by an increasing demand for wireless devices along with improvements in wireless communications platforms and systems. Users may exchange information through pagers, cellular telephones other wireless communications and computer based products. Wireless communication provides users the benefit of exchanging personal and business information employing wireless networks such as a wireless local area network (WLAN). A WLAN provides flexibility and mobility for users by enabling access to a spectrum of communication and computer networks, including the Internet, without being restricted to a wired network.

Several standards have been established to provide uniformity and support growth in the development of wireless networks. One such standard that has been promulgated by the Institute of Electrical and Electronic Engineers (IEEE) is IEEE 802.11, which is incorporated herein by reference. IEEE 802.11 is an overarching standard that encompasses a family of specifications pertaining to wireless communication. Generally, IEEE 802.11 specifies an over-the-air interface between a wireless client and a base station or between two wireless clients.

Within the IEEE 802.11 family are several specifications covering topics such as different transmission rates, encoding schemes and frequency bands for transmitting data wirelessly. For example, IEEE 802.11a is an extension of IEEE 802.11 that specifically addresses WALES having a data rate up to 54 Mbps and employing a carrier frequency of five GHz. Additionally, IEEE 802.11a specifies an orthogonal frequency division multiplexing (OFDM) encoding scheme.

Multiple-input multiple output (MIMO) communication systems provide improvements in capacity and reliability over single-input single-output (SISO) communication systems and may be employed to advantage in wireless networks and communication systems. The MIMO communication systems commonly employ a block structure wherein a MIMO transmitter, which is actually a collection of single-dimension transmitters, sends a vector of symbol information. This symbol vector may represent one or more coded or uncoded SISO data symbols. A MIMO receiver, which is a collection of single-dimension receivers, receives one or more copies of this transmitted symbol vector. The performance of the entire communication system hinges on the ability of the receiver to find reliable estimates of the symbol vector that was transmitted.

A 2×2 MIMO communication system may transmit two independent and concurrent signals employing two single-dimension transmitters having separate transmit antennas and two single-dimension receivers having separate receive antennas. When currently employing IEEE 802.11a/g, a SIGNAL field is transmitted in order to convey parameters (such as rate, length, etc.) associated with a data field. The rate portion of the SIGNAL field conveys information about the type of transmit modulation employed, and a coding rate used in the remainder of a packet. The length portion of the SIGNAL field indicates a number of octets in a physical layer supporting the transmission. For such MIMO communication systems, there may also be multiple or additional MIMO modes that may be selected. The existing SIGNAL field generally cannot accommodate all of these options, especially for a legacy MIMO communication system employing IEEE 802.11a/g wherein backwards compatibility is to be maintained.

Accordingly, what is needed in the art is a way to provide additional transmission mode information that fits within a current transmission framework.

SUMMARY OF THE INVENTION

To address the above-discussed deficiencies of the prior art, the present invention, for use with a MIMO transmitter, is directed to a signal field controller, a method of controlling signal fields and a MIMO transmitter incorporating the controller or the method. In one embodiment, the controller includes: (1) a primary signal field mode indicator configured to cause a primary signal field to indicate a presence of a supplemental signal field and provide the primary signal field to the MIMO transmitter for transmission thereby and (2) a supplemental signal field generator coupled to the primary signal field mode indicator and configured to provide a supplemental signal field to the MIMO transmitter for further transmission thereby only when the primary signal field indicates the presence.

In another aspect, the present invention provides a method of controlling signal fields for use with a multiple-input, multiple-output (MIMO) transmitter, comprising: (1) causing a primary signal field to indicate a presence of a supplemental signal field and provide the primary signal field to the MIMO transmitter for transmission thereby and (2) providing a supplemental signal field to the MIMO transmitter for further transmission thereby only when the primary signal field indicates the presence.

The present invention also provides, in yet another aspect, a multiple-input, multiple output (MIMO) transmitter, comprising: (1) a plurality of transmitters and (2) a signal field controller, including: (2a) a primary signal field mode indicator that causes a primary signal field to indicate a presence of a supplemental signal field and provide the primary signal field to the plurality of transmitters for transmission thereby and (2b) a supplemental signal field generator, coupled to the primary signal field mode indicator, that provides a supplemental signal field to the plurality of transmitters for further transmission thereby only when the primary signal field indicates its presence.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
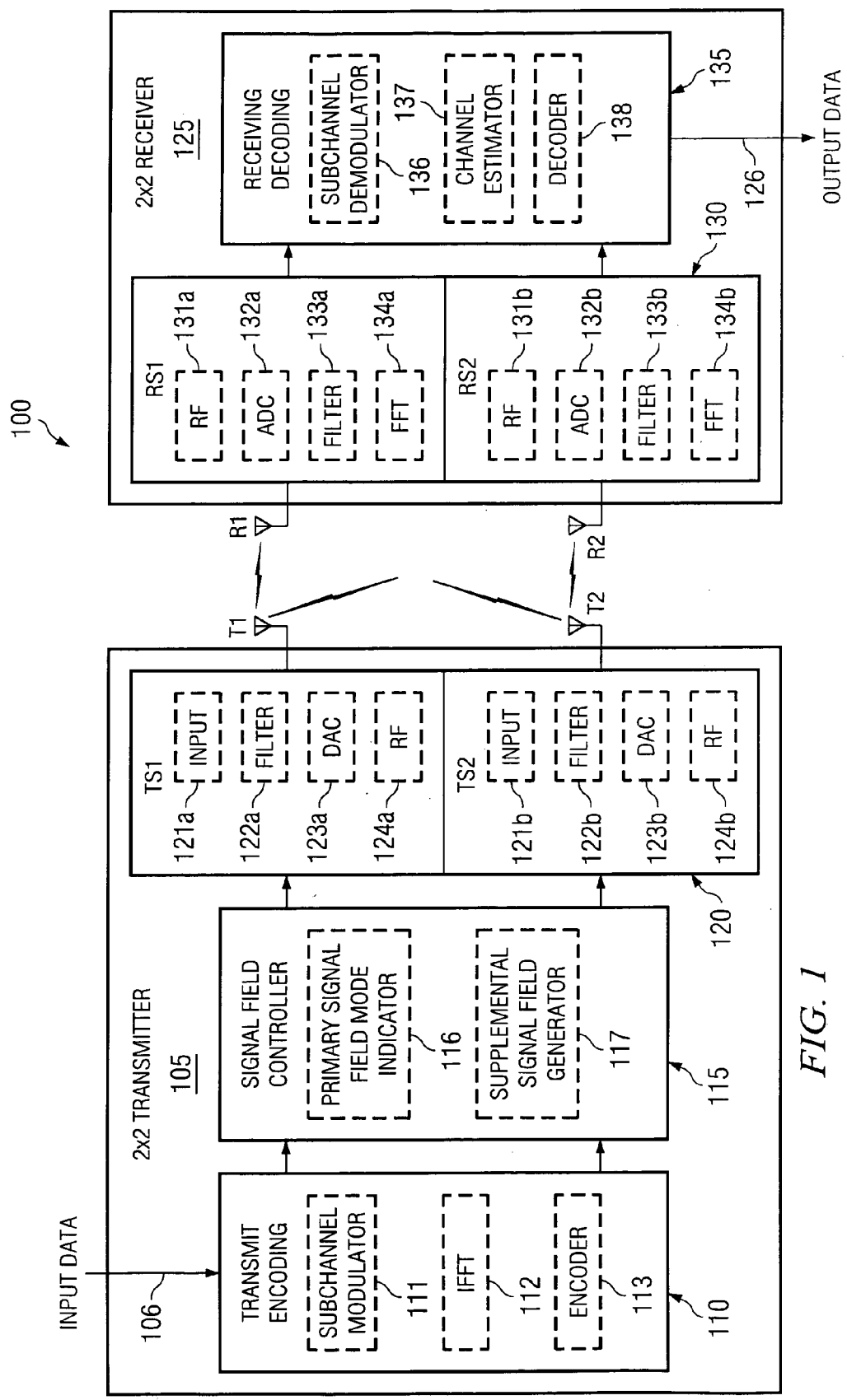
FIG. 1 illustrates a system diagram of an embodiment of a 2×2 multiple-input, multiple-output (MIMO) communication system constructed in accordance with the principles of the present invention.

Referring initially to FIG. 1, illustrated is a system diagram of an embodiment of a 2×2 multiple-input, multiple-output (MIMO) communication system, generally designated 100, constructed in accordance with the principles of the present invention. The MIMO communication system 100 includes a transmitter 105 and a receiver 125. The transmitter 105 employs input data 106 and includes a transmit encoding system 110, a signal field controller 115 and a transmit system 120 having first and second transmit sections TS1, TS2 coupled to first and second transmit antennas T1, T2, respectively. The MIMO receiver 125 includes a receive system 130 having first and second receive sections RS1, RS2 respectively coupled to first and second receive antennas R1, R2, and a receive decoding system 135 that provides output data 126.

The transmit encoding system 110 includes a subchannel modulator 111, an Inverse Fast Fourier Transform (IFFT) section 112 and an encoder 113. The subchannel modulator 111, IFFT section 112 and encoder 113 prepare the input data 106 and arrange preamble and primary signal field information for transmission by the transmit system 120. The preamble information provides a training sequence for the MIMO receiver 125 that allows establishing a communication channel estimate, which is needed to process the transmission. The signal field controller 115 includes a primary signal field mode indicator 116 and a supplemental signal field generator 117, which provide primary and supplemental signal fields for transmission by the transmit system 120.

The first and second transmit sections TS1, TS2 include first and second input sections 121a, 121b, first and second filters 122a, 122b, first and second digital to analog converters (DACs) 123a, 123b and first and second RF sections 124a, 124b, respectively. The first and second transmit sections TS1, TS2 provide a time domain RF signal proportional to the preamble, signal fields and input data 106 for transmission by the first and second transmit antennas T1, T2, respectively.

The first and second receive antennas R1, R2 receive the transmission and provide it to the first and second receive sections RS1, RS2, which include first and second RF sections 131a, 131b, first and second analog to digital converters (ADCs) 132a, 132b, first and second filters 133a, 133b, and first and second Fast Fourier Transform (FFT) sections 134a, 134b, respectively. The first and second receive sections RS1, RS2 provide a frequency domain digital signal, proportional to the preamble, signal fields and the input data 106, to the receive decoding system 135. The receive decoding system 135 includes a subchannel demodulator 136, a channel estimator 137 and a decoder 138 that provides the output data 126.

The signal field controller 115 employs the primary signal field mode indicator 116 to provide at least one indicator bit in the primary signal field that the supplemental signal field is present. The supplemental signal field generator 117 is coupled to the primary signal field mode indicator 116 and cooperates to provide the supplemental signal field when the primary signal field so indicates. The primary and supplemental signal fields are provided to the first and second transmit sections TS1, TS2 for transmission.

The primary and supplemental signal fields may be organized into several formats for transmission. In one of these formats, the primary and supplemental signal fields are combined into a composite signal field that employs the primary signal field having constellation points along a first axis and the supplemental signal field having constellation points along a second axis. For example, the primary signal field may be a binary phase shift key (BPSK) signal having constellation points along a real axis, and the supplemental signal field may be a BPSK signal having constellation points along an imaginary axis. Alternatively, the primary and supplemental signal fields may have respective constellation points located on orthogonal axes that bear a rotational displacement to the real and imaginary axes (e.g., such as 45 degrees). Of course, the primary and supplemental signal field may employ axes that are not orthogonal thereby having differing rotational displacements to the real and imaginary axes as appropriate to a particular application.

This format allows the primary and supplemental signal fields to be transmitted together employing one or more transmit antennas. Alternatively, a concurrent transmission format may be employed that allows transmission of the supplemental signal field to be concurrent with the primary signal field employing at least two transmit antennas. Additionally, a transmission of the supplemental signal field may be subsequent to a transmission of the primary signal field employing one or more transmit antennas.

In the illustrated embodiment, the primary signal field is composed of 24 bits allocated as four transmission rate bits, a reserve bit, 12 transmission vector length bits, a parity bit and six signal tail bits. The reserve bit is used to indicate that the transmission is a MIMO mode, and that the supplemental signal field is present. In an alternative embodiment, one of the six signal tail bits may be employed to so indicate. The supplemental signal field may include up to an additional 48 bits that contain MIMO mode information. The supplemental signal field may include any information deemed pertinent to the MIMO transmission. For example, this additional MIMO mode information may indicate that one of several possible MIMO modes has been selected. The supplemental signal field may be employed to indicate more rate sets or other special features requiring more bits to define. These supplemental signal field bits may be either encoded or not encoded as appropriate to an application.

Those skilled in the art will understand that the present invention can be applied to other conventional and future-discovered MIMO communication systems. For example, these systems may form a part of a selected one of a narrowband wireless communication system employing multiple antennas, a broadband communication system employing time division multiple access (TDMA) or a general multiuser communication system.

Figure 2A:
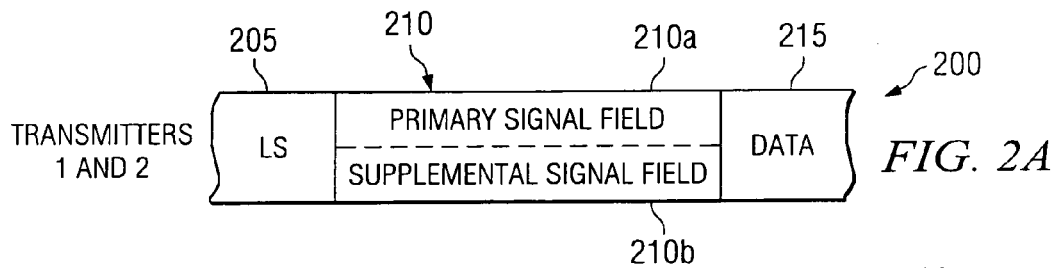
FIG. 2A illustrates a partial diagram of an embodiment of a composite transmission frame employing a supplemental signal field and constructed in accordance with the principles of the present invention.
Figure 2B:
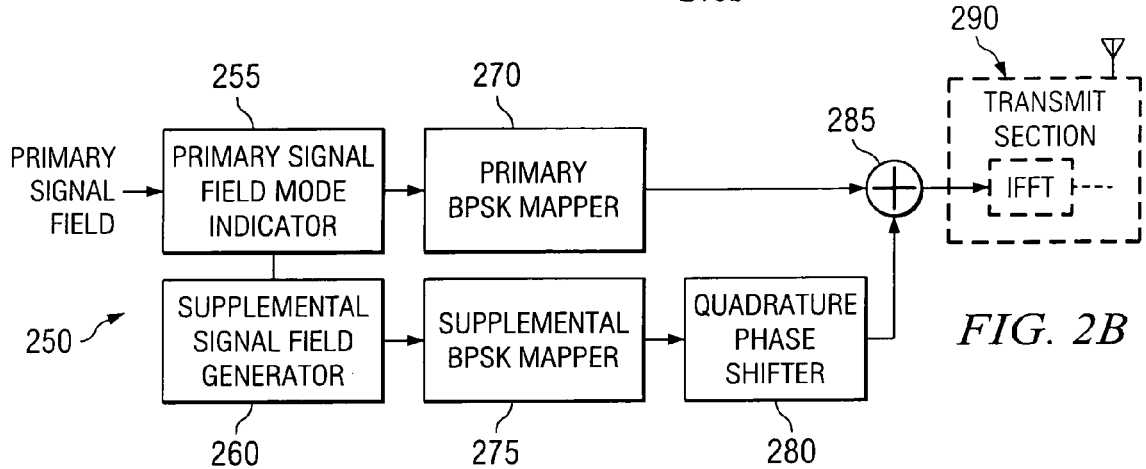
FIG. 2B illustrates a block diagram of an embodiment of a signal field controller constructed in accordance with the principles of the present invention.

Turning now to FIG. 2A, illustrated is a partial diagram of an embodiment of a composite transmission frame, generally designated 200, employing a supplemental signal field and constructed in accordance with the principles of the present invention. The composite transmission frame 200 may be employed with at least one of the first and second MIMO transmitters as discussed with respect to FIG. 1. The composite transmission frame 200 includes a portion of a preamble 205 containing a long training sequence LS, a composite signal field 210 employing primary and supplemental signal fields 210a, 210b and a portion of a transmit payload 215 containing data to be transmitted. The composite transmission frame 200 indicates that the primary and secondary signal fields 210a, 210b are to be transmitted together. This is analogous to transmitting the signal fields at twice the transmission rate selected. FIG. 2B illustrates an embodiment of a signal field controller configured to accomplish this transmission.

Turning now to FIG. 2B, illustrated is a block diagram of an embodiment of a signal field controller, generally designated 250, constructed in accordance with the principles of the present invention. The signal field controller 250 includes a primary signal field mode indicator 255 that receives the primary signal field 210a, a supplemental signal field generator 260 that generates the supplemental signal field 210b, primary and supplemental binary phase shift key (BPSK) mappers 270, 275, a quadrature phase shifter 280 and a summing junction 285. The output of the summing junction 285 provides the composite primary and supplemental signal fields to a transmit section 290.

The signal field controller 250 employs the primary BPSK mapper 270 to convert the primary signal field 210a into a BPSK signal having constellation points along a real axis. Similarly, the signal field controller 250 employs the supplemental BPSK mapper 275 and the quadrature phase shifter 280 to convert the supplemental signal field 210b into a BPSK signal having constellation points along an imaginary axis. This composite signal field arrangement allows transmission of both primary and supplemental signal fields 210a, 210b together from the transmit section 290. In an alternative embodiment, the composite signal field may be transmitted from a plurality of transmit sections.

Figure 3:
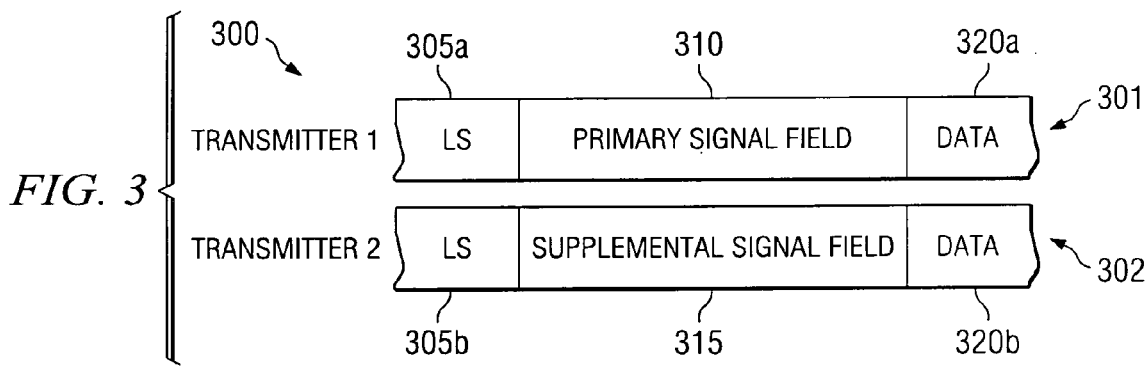
FIG. 3 illustrates a partial diagram of an embodiment of a separate concurrent transmission format employing a supplemental signal field and constructed in accordance with the principles of the present invention.

Turning now to FIG. 3, illustrated is a partial diagram of an embodiment of a separate concurrent transmission format, generally designated 300, employing a supplemental signal field and constructed in accordance with the principles of the present invention. The separate concurrent transmission format 300 may also be employed with the first and second MIMO transmitters as discussed with respect to FIG. 1 and includes first and second concurrent transmission frames 301, 302 associated with the first and second MIMO transmitters, respectively.

The first concurrent transmission frame 301 includes a portion of a preamble 305a containing a long training sequence LS, a primary signal field 310 and a portion of a transmit payload 320a containing data to be transmitted. The second concurrent transmission frame 302 includes a portion of a preamble 305b containing a long training sequence LS, a supplemental signal field 315 and a portion of a transmit payload 320b containing data to be transmitted. The separate concurrent transmission format 300 allows concurrent transmission of the primary and supplemental signal fields 310, 315 from first and second transmit sections employing separate transmit antennas.

Figure 4:
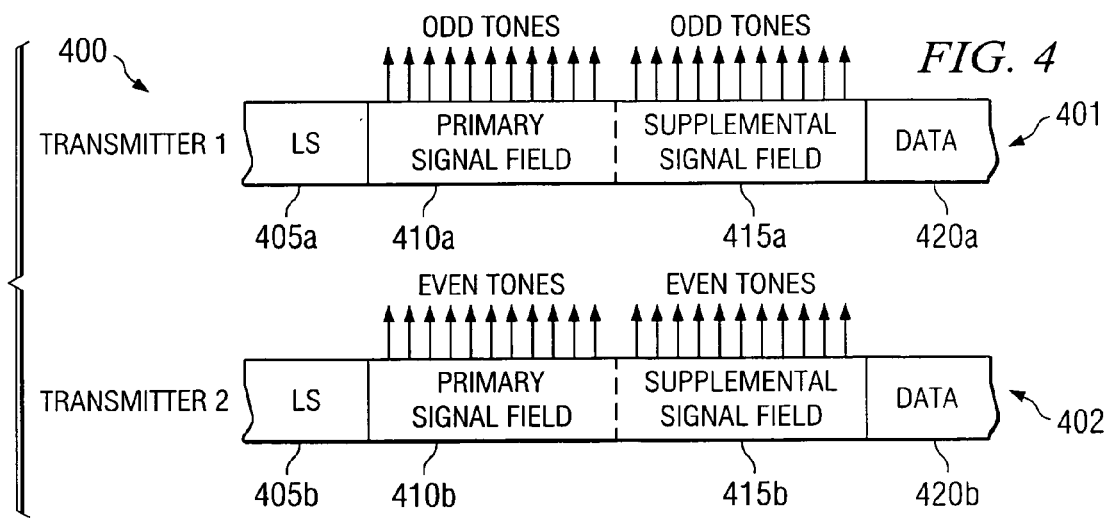
FIG. 4 illustrates a partial diagram of an embodiment of a shared concurrent transmission format employing a supplemental signal field and constructed in accordance with the principles of the present invention.

Turning now to FIG. 4, illustrated is a partial diagram of an embodiment of a shared concurrent transmission format, generally designated 400, employing a supplemental signal field and constructed in accordance with the principles of the present invention. The shared concurrent transmission format 400 may also be employed with the first and second MIMO transmitters as discussed with respect to FIG. 1 and includes first and second concurrent transmission frames 401, 402 associated with the first and second MIMO transmitters, respectively.

The first and second concurrent transmission frames 401, 402 include portions of preambles 405a, 405b containing a long training sequence LS, a primary signal field initial subset 410a, a primary signal field remaining subset 410b, a supplemental signal field initial subset 415a, a supplemental signal field remaining subset 415b, and portions of a transmit payload 420a, 420b containing data to be transmitted, respectively. In the illustrated embodiment, the first and second concurrent transmission frames 401, 402 allow a supplemental signal field generator to provide the supplemental signal field initial subset 415a and the supplemental signal field remaining subset 415b for concurrent transmission. This transmission follows a concurrent transmission of the primary signal field initial subset 410a and the primary signal field remaining subset 410b wherein both first and second MIMO transmitters are employed.

In the embodiment of FIG. 4, the first and second concurrent transmission frames 401, 402 illustrate an example where the primary signal field initial subset 410a employs its odd sub-carrier tones and the primary signal field remaining subset 410b employs its even sub-carrier tones. Similarly, the supplemental signal field initial subset 415a employs its odd sub-carrier tones and the supplemental signal field remaining subset 415b employs its even sub-carrier tones. In an alternative embodiment, other initial subsets and remaining subsets may be employed as advantageous to a particular application.

Figure 5:
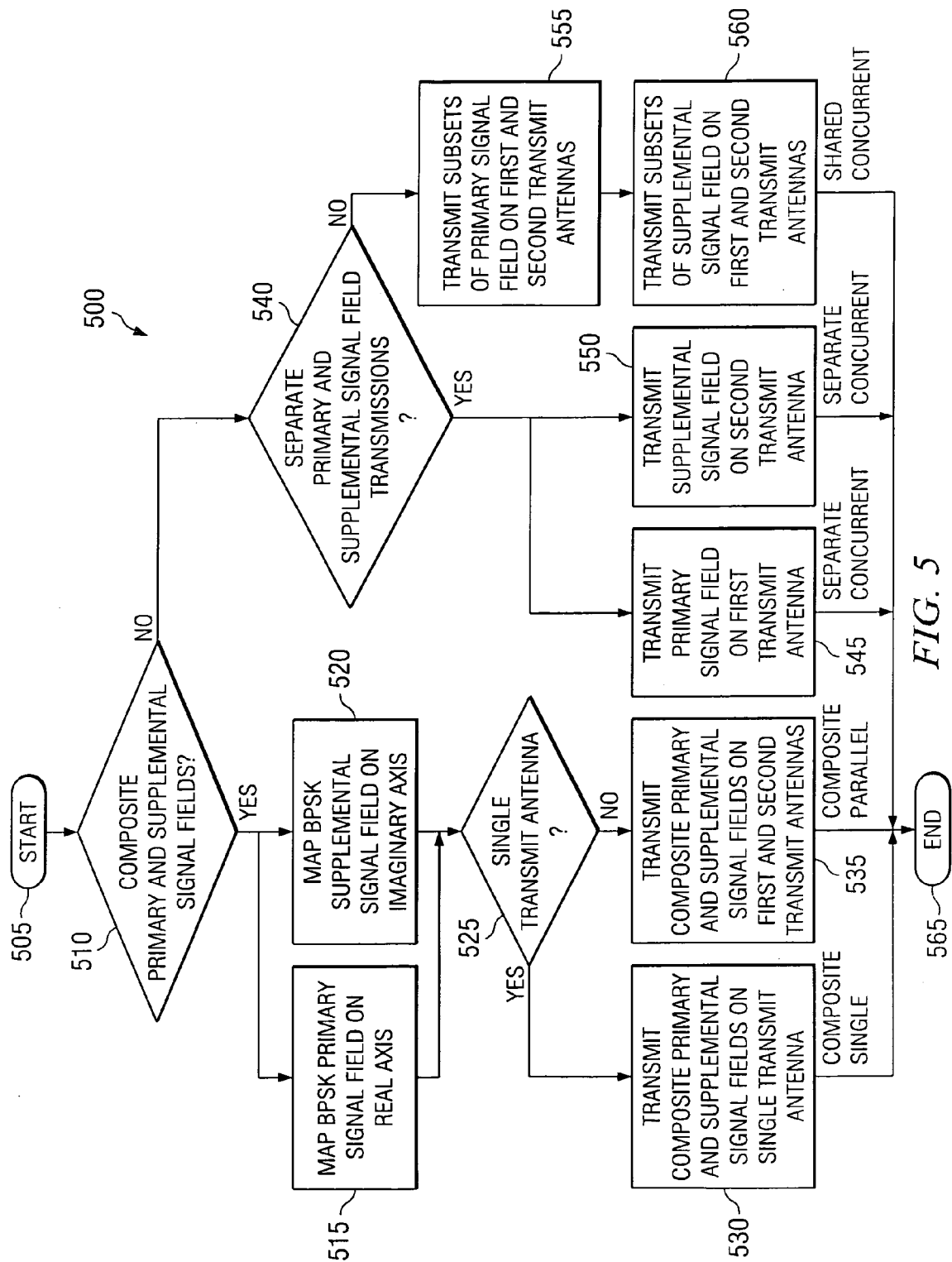
FIG. 5 illustrates a flow diagram of an embodiment of a method of controlling signal fields carried out in accordance with the principles of the present invention.

Turning now to FIG. 5, illustrated is a flow diagram of an embodiment of a method of controlling signal fields, generally designated 500, carried out in accordance with the principles of the present invention. The method 500 starts in a step 505 with an intent to transmit primary and supplemental signal fields from a MIMO transmitter employing at least first and second transmit sections having respective transmit antennas. The supplemental signal field may employ up to 48 bits and contains mode information pertaining to the MIMO transmission. A first decisional step 510 determines if the primary and supplemental signal fields are combined into a composite signal field for transmission.

If the composite signal field is employed, the primary signal field is mapped into a binary phase shift key (BPSK) signal having constellation points along a real axis in a step 515. Similarly, the supplemental signal field is mapped into a BPSK signal having constellation points along an imaginary axis in a step 520. Then a second decisional step 525 determines if the composite signal field is to be transmitted over a single transmit antenna. If the single transmit antenna is employed, the composite primary and supplemental signal fields are transmitted on the single transmit antenna thereby providing a single composite single transmission in a step 530. If the second decisional step 525 determines that a plurality of transmit antennas are to be employed, the composite primary and supplemental signal fields are transmitted on both the first and second transmit antennas thereby providing parallel composite transmissions in a step 535. Then, the method 500 ends in a step 565.

If the first decisional step 510 determines that a composite signal field is not employed, a third decisional step 540 determines if the primary and supplemental signal fields are to be employed in a separate concurrent transmission. If a separate concurrent transmission is employed, the primary signal field is transmitted on the first transmit antenna in a step 545, and the supplemental signal field is transmitted on the second transmit antenna in a step 550 thereby providing separate concurrent transmissions. Then, the method 500 again ends in the step 565.

If the third decisional step 540 determines that separate primary and supplemental signal fields are not employed, then a shared concurrent transmission is employed. Initial and remaining subsets of the primary signal field are transmitted on first and second transmit antennas, respectively, in a step 555. Subsequently, initial and remaining subsets of the supplemental signal field are transmitted on the first and second transmit antennas, in a step 560, thereby providing a shared concurrent transmission of the primary and supplemental signal fields. Then, the method 500 ends in the step 565.

While the method disclosed herein has been described and shown with reference to particular steps performed in a particular order, it will be understood that these steps may be combined, subdivided, or reordered to form an equivalent method without departing from the teachings of the present invention. Accordingly, unless specifically indicated herein, the order or the grouping of the steps are not limitations of the present invention.

In summary, embodiments of the present invention employing a signal field controller and a method of controlling signal fields for use with a MIMO transmission have been presented. Advantages include employing a primary signal field mode indicator to indicate the presence of a supplemental signal field containing additional information related to the MIMO transmission. A supplemental signal field generator provides the supplemental signal field, which may be employed with the primary signal field in composite, separate concurrent or shared concurrent modes of transmission. The supplemental signal field may be encoded differently than the primary signal field, or it may not be encoded as appropriate to a particular application. Additionally, the primary and supplemental signal fields may be transmitted at different power levels.

Although the present invention has been described in detail, those skilled in the art should understand that they can make various changes, substitutions and alterations herein without departing from the spirit and scope of the invention in its broadest form.

What is claimed is:

1. A signal field controller for use with a multiple-input, multiple-output (MIMO) transmitter, comprising:
   a primary signal field mode indicator configured to cause a primary signal field to indicate a presence of a supplemental signal field and provide said primary signal field to said MIMO transmitter for transmission thereby; and
   a supplemental signal field generator coupled to said primary signal field mode indicator and configured to provide a supplemental signal field to said MIMO transmitter for further transmission thereby only when said primary signal field indicates said presence wherein said primary and supplemental signal fields are combined into a composite signal field employing said primary signal field having constellation points along a first axis and said supplemental signal field having constellation points along a second axis.

2. The controller as recited in claim 1, wherein a transmission of said composite signal field employs one selected from the group consisting of:
   a single transmit antenna; and
   first and second transmit antennas.

3. The controller as recited in claim 1 wherein an initial subset and a remaining subset of said supplemental signal field are subsequent to an initial subset and a remaining subset of said primary signal field in a substantially concurrent transmission.

4. The controller as recited in claim 1 wherein a transmission of said supplemental signal field is substantially concurrent with a transmission of said primary signal field.

5. The controller as recited in claim 1 wherein said supplemental signal field contains mode information for said MIMO transmitter.

6. The controller as recited in claim 1 wherein said supplemental signal field employs up to 48 bits.

7. A method of controlling signal fields for use with a multiple-input, multiple-output (MIMO) transmitter, comprising:
   causing a primary signal field to indicate a presence of a supplemental signal field and provide said primary signal field to said MIMO transmitter for transmission thereby; and
   providing a supplemental signal field to said MIMO transmitter for further transmission thereby only when said primary signal field indicates said presence wherein said primary and supplemental signal fields are combined into a composite signal field employing said primary signal field having constellation points along a first axis and said supplemental signal field having constellation points along a second axis.

8. The method as recited in claim 7, wherein a transmission of said composite signal field employs one selected from the group consisting of:
   a single transmit antenna; and
   first and second transmit antennas.

9. The method as recited in claim 7 wherein an initial subset and a remaining subset of said supplemental signal field are subsequent to an initial subset and a remaining subset of said primary signal field in a substantially concurrent transmission.

10. The method as recited in claim 7 wherein a transmission of said supplemental signal field is substantially concurrent with a transmission of said primary signal field.

11. The method as recited in claim 7 wherein said supplemental signal field contains mode information for said MIMO transmitter.

12. The method as recited in claim 7 wherein said supplemental signal field employs up to 48 bits.

13. A multiple-input, multiple output (MIMO) transmitter, comprising:
   a plurality of transmitters; and
   a signal field controller, including:
      a primary signal field mode indicator that causes a primary signal field to indicate a presence of a supplemental signal field and provide said primary signal field to said plurality of transmitters for transmission thereby, and a supplemental signal field generator, coupled to said primary signal field mode indicator, that provides a supplemental signal field to said plurality of transmitters for further transmission thereby only when said primary signal field indicates said presence, wherein said primary and supplemental signal fields are combined into a composite signal field employing said primary signal field having constellation points along a first axis and said supplemental signal field having constellation points along a second axis.

14. The transmitter as recited in claim 13, wherein a transmission of said composite signal field employs one selected from the group consisting of:
   a single transmit antenna; and
   first and second transmit antennas.

15. The transmitter as recited in claim 13 wherein an initial subset and a remaining subset of said supplemental signal field are subsequent to an initial subset and a remaining subset of said primary signal field in a substantially concurrent transmission.

16. The transmitter as recited in claim 13 wherein a transmission of said supplemental signal field is substantially concurrent with a transmission of said primary signal field.

17. The transmitter as recited in claim 13 wherein said supplemental signal field contains mode information for said MIMO transmitter.

18. The transmitter as recited in claim 13 wherein said supplemental signal field employs up to 48 bits.

19. A multiple-input, multiple output (MIMO) transmitter, comprising:
   a plurality of transmitters; and
   a signal field controller, including:
      a primary signal field mode indicator that causes a primary signal field to indicate a presence of a supplemental signal field and provide said primary signal field to said plurality of transmitters for transmission thereby, and
      a supplemental signal field generator, coupled to said primary signal field mode indicator, that provides a supplemental signal field to said plurality of transmitters for further transmission thereby only when said primary signal field indicates said presence, wherein an initial subset and a remaining subset of said supplemental signal field are subsequent to an initial subset and a remaining subset of said primary signal field in a substantially concurrent transmission.

* * * * *